United States Patent [19]

Metwalli

[11] Patent Number: 5,189,552
[45] Date of Patent: Feb. 23, 1993

[54] INCIDENCE ANGLE LIGHT ATTENUATOR FOR LIGHT TRANSMISSIVE PANELS

[76] Inventor: Sayed M. Metwalli, 1029 Howell Harbor Dr., Casselberry, Fla. 32707

[21] Appl. No.: 753,910

[22] Filed: Sep. 3, 1991

[51] Int. Cl.⁵ .................................. G02F 1/01
[52] U.S. Cl. ..................... 359/489; 359/501; 359/493
[58] Field of Search .................. 359/489, 501, 493

[56] References Cited

U.S. PATENT DOCUMENTS

| | | | |
|---|---|---|---|
| 2,230,262 | 2/1941 | Pollack | 359/501 |
| 3,521,940 | 7/1970 | Heckman, Jr. | 350/148 |
| 4,090,732 | 5/1978 | Vistitsky | 296/97 C |
| 4,123,141 | 10/1978 | Schuler | 350/159 |
| 4,285,577 | 8/1981 | Schuler | 350/403 |
| 4,351,557 | 9/1982 | Chary | 296/97 D |
| 4,579,426 | 4/1986 | Onufry | 350/407 |
| 4,722,597 | 2/1988 | Takubo et al. | 350/387 |
| 4,832,468 | 5/1989 | Ito et al. | 350/357 |
| 4,893,908 | 1/1990 | Wolf et al. | 350/357 |

FOREIGN PATENT DOCUMENTS 02279891 11/1990 Japan .................. 359/501

*Primary Examiner*—Constantine Hannaher
*Assistant Examiner*—Don Wong
*Attorney, Agent, or Firm*—James H. Beusse

[57] ABSTRACT

A method and apparatus for controlling light attenuation through a light transmissive panel uses polarized film sheets positioned on opposing surfaces of the panel. The film sheet comprises alternating strips or fields of film of different polarization so chosen that light passing through strips of different polarization is significantly attenuated whereas light passing through strips of the same polarization is only attenuated to a preselected degree. The film sheets are oriented on the opposing surfaces of the panel such that light passing through within a preselected range of incidence angles passes through strips of common polarization. Light impinging on the panel at other incidence angles passes through strips of different polarization and is significantly polarized or may have varying polarization in order to provide an attenuation within step changes. The panel may comprise automobile window glass for attenuating sunlight while allowing substantially unattenuated horizontal viewing or may be applied vertically to auto headlamps for reducing glare directed toward approaching vehicles.

2 Claims, 1 Drawing Sheet

INCIDENCE ANGLE LIGHT ATTENUATOR FOR LIGHT TRANSMISSIVE PANELS

BACKGROUND OF THE INVENTION

This invention relates to light transmissive panels such as windows or windshields and, more particularly, to a method and apparatus for limiting light transmission through such panels as a function of light incidence angle.

There are numerous applications in which it is desirable to allow light to pass through a light transmissive panel without significant attenuation in a range of incidence angles while greatly attenuating light impinging on the panel at other angles. For example, in automobile windshields, it is generally desirable not to affect a driver's view by attenuating light transmission through the windshield in a substantially horizontal, forward direction. At the same time, it may be desirable to block or significantly attenuate bright, overhead sunlight through the windshield as well as through other windows of the vehicle since such sunlight tends to heat the automobile and to fade or otherwise damage cloth, vinyl, or leather interiors. As another example, it may be desirable to attenuate sunlight shining through windows of a building in order to reduce its heating effect while maintaining the ability of an occupant to see through the window. Still another use may be in directional control of incident light for use with optical signalling or in exiting light from auto headlamps or traffic signals.

It has been known to provide light attenuation through windows, windshields, and other light transmissive panels by use of polarized film attached to or held adjacent such panels. For example, U.S. Pat. No. 4,123,141 describes a window system incorporating polarized panels which may be adjusted between a pair of positions to either minimize or maximize light transmission therethrough. Similarly, U.S. Pat. No. 4,090,732 describes an attachment to an automobile visor comprising a pair of polarized panels, one of which is polarized at a different angle with respect to the other so that when used in combination, glare is substantially reduced below that normally obtained by use of only one panel.

While the above described systems are effective to minimize light transmission, these systems are not generally incidence angle sensitive. Their primary mode of operation is to reduce light transmission at all angles. For application to automobile windshields, systems such as that in U.S. Pat. No. 4,090,732 are designed to cover only limited areas since coverage of the entire windshield would impede the vehicle operator's vision. Thus, it would be desirable to provide a system for reducing light transmission from overhead sunlight with minimal effect on an operator's forward vision.

SUMMARY OF THE INVENTION

The above and other disadvantages of the prior art are minimized in a system according to the present invention in which polarized film is used on light transmissive panels, such as windows or automobile windshields, in such a manner that light transmission is significantly attenuated at some range of incidence angles and only minimally attenuated at other angles. In general, the system employs a first sheet of polarized film having a first plurality of strips of polarized film of a first polarization spaced apart by a second plurality of strips of polarized film of a second polarization. The sheet of polarized film is overlayed on a first surface of a light transmissive panel and arranged such that the polarized strips are in a substantially parallel, horizontal orientation. A corresponding second sheet of polarized film is overlayed on an opposite surface of the panel such that the polarized strips of identical polarization are aligned in a common horizontal plane when the panel is positioned generally vertically. The first plurality of strips has an absorption axis different from the absorption axis of the second plurality of strips so that light passing through strips of different polarization is significantly attenuated, as will happen when light impinges on the panel at an angle a preselected deviation from horizontal. Preferably, the polarization orientation of the first plurality of strips (or fields) is normal to the polarization orientation of the second plurality of strips to maximally attenuate light passing through both of the differently polarized strips.

When applied to a windshield, the strips are positioned on each surface such that forward vision of the vehicle operator relies on light passing through only similar layers of polarized film and is therefore minimally attenuated. However, sunlight impinging on the windshield from an angle above horizontal may pass through differently polarized film on both surfaces of the windshield and be significantly attenuated. The incidence angle attenuation may be established by the thickness of the panel in combination with the width of the strips.

The invention may also be used on auto headlamps to control light direction so as to minimize glare directed toward on-coming vehicles. In such application, the strips may be vertically oriented rather than horizontal.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
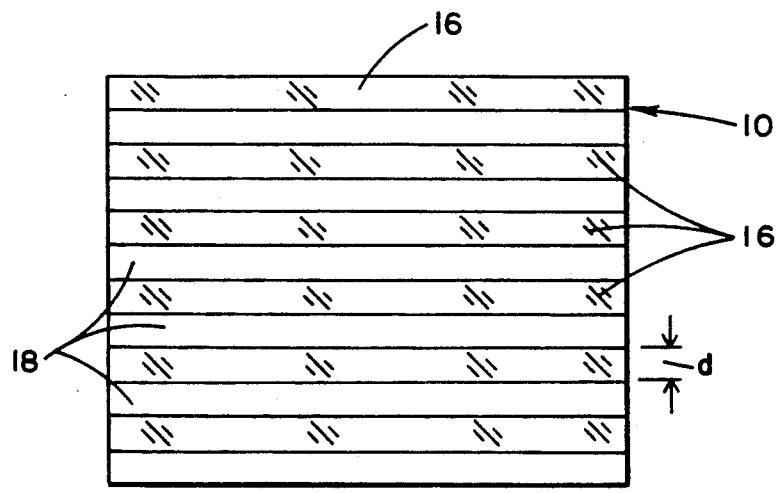
FIG. 1 is a planar view of a light transmissive panel with polarized strips arranged on a surface thereof.
Figure 2:
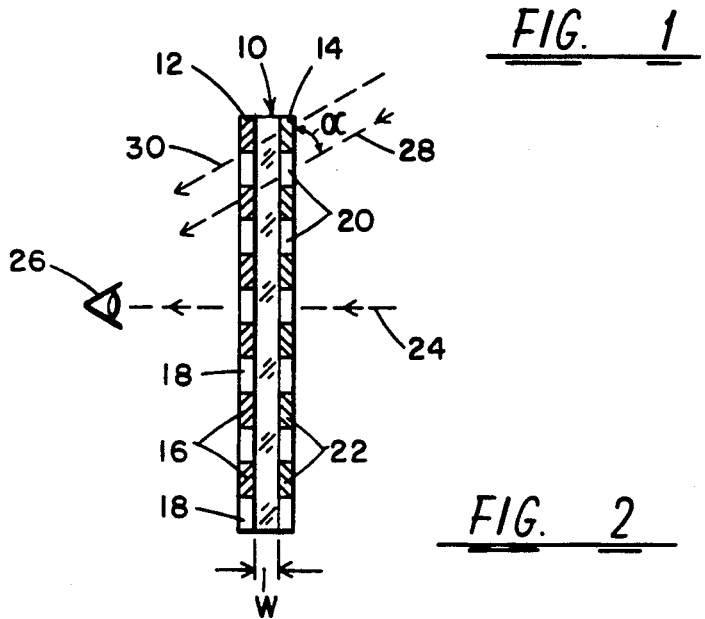
FIG. 2 is an edge view of the panel of FIG. 1 showing polarized strips on each side surface of the panel and the effect of the strips on light attenuation as a function of incidence angle.

Referring generally to FIGS. 1 and 2, a light transmissive panel 10, such as a window or automobile windshield, is covered by a film 12 on one surface and by a film 14 on an opposite surface. Each of the films 12 and 14 has a plurality of attenuating strips of different absorption axis of polarized films. Film 12 includes polarized strips 16 having an absorption axis aligned in a first predetermined direction. The strips 16 are arranged in generally horizontal, parallel rows spaced apart by sections of film strips 18 of absorption axis differently oriented from strips 16. Film 14 includes polarized strips 20 having an absorption axis aligned in the same predetermined direction as strips 16 and spaced apart by film strips 22 having an absorption axis oriented in the same direction as film strips 18. The strips 20 are aligned to overlay the film strips 16 while strips 22 overlay strips 18.

The above described arrangement is such that a horizontal line of sight, indicated by line 24, from or to eye 26 passes through only similarly polarized strips 16 and 20 or 18 and 22, thus being minimally attenuated. However, light rays such as indicated by line 28 pass through a strip 16 and a strip 22. Since the strips 16 and 22 are differently polarized, the light ray 28 is significantly attenuated. Similarly, light rays such as indicated by line 30 pass through a strip 18 and a strip 20. Since the strips 18 and 20 are differently polarized, the light ray 30 is also significantly attenuated.

It will be appreciated that the incidence angle α, i.e., the angle at which light rays 28 impinging on panel 10 pass through polarized film on both sides of the panel, can be selected to fall within various ranges by changing the width d of the strips 16 and 20 and by establishing a different spacing W between the films 12 and 14. In the case of a windshield which is generally a multi-layer panel, one of the films 12 and 14 could be sandwiched inside the panel thus reducing the spacing between films. While the width d can be varied, it is desirable that the width of strips 16 be substantially the same as the width of strips 20.

It is also noted that automobile windshields are generally angularly oriented rather than being placed vertically as shown in FIG. 2. For such angular orientation, the location of the strips 16, 18, 20, and 22 can be adjusted such that line of sight 24 passes through only similarly polarized strips.

Figure 3:
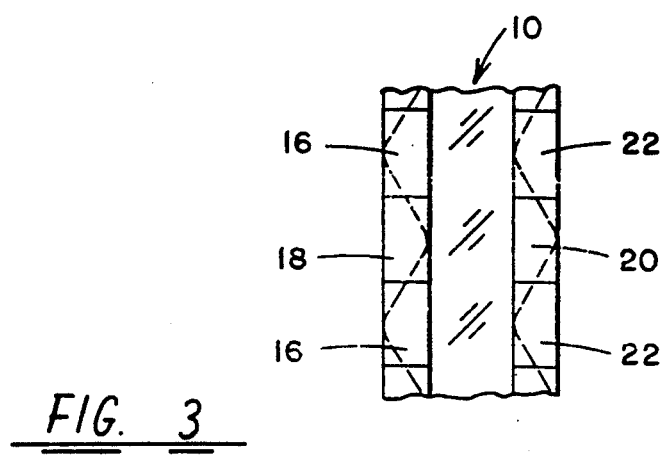
FIG. 3 illustrates the use of varying polarization orientation in the polarized film strips.

The strips 16, 18, 20, and 22 may each be uniformly polarized. However, it will be appreciated that as the viewing angle from eye 26 is gradually changed from horizontal, e.g., zero degrees, to some larger angle such as sixty degrees, the eye will observe a sequence of bright and dark striations. This occurs since the line-of-sight at some angles will pass through film strips of similar polarization. One method for reducing the striation effect is to form the polarized strips with varying characteristics. In FIG. 3, the polarization (and the associated strips) is represented by an approximate sine wave indicating maximum polarization in one direction at the center of a strip with varying polarization orientation toward the edges of the strip. Adjacent strips have the same characteristic but with a different polarization. Thus, light passing through the middle portions of strips of different polarization will be maximally attenuated while light through other portions will have different attenuation.

Light passing through the panel of FIG. 3 will experience a varying attenuation which is gradual and therefore less noticeable than occurs with the uniformly polarized strips of FIG. 2. The step-changes in attenuation in FIG. 2 will give rise to noticeable striations as described above. Variations in polarization orientation other than sine waves may be used and may further improve the uniformity of attenuation over the extent of the panel.

While the invention has been described in terms of a film which can be adhered to a panel in a conventional manner but having alternate strips of differently polarized sections, the invention could be implemented by adhering individual polarized strips to the panel. Further, the invention could be implemented using electrochromic conductive polymers to allow selective attenuation. Alternatively, instead of strips 18 and 16 or 20 and 22, the absorption axis of film 12 in the location of the middle of 18 can be gradually changing to reach the orientation of the absorption axis in the middle of 16 and the same is done for film 14 in the middle of 20 to the middle of 22. Films 12 and 14 can thus be identical in construction. Still further, while the invention has been described in terms of light attenuation entering a panel, the invention may also be used to attenuate light at certain angles in auto headlamps and other applications. For example, the strips could be placed on headlamps in a vertical pattern to attenuate light directed into the path of an approaching vehicle. Furthermore, while the invention is generally described in applications wherein the attenuation is desirably minimized at incidence angles about a generally horizontal plane, it will be appreciated that the strips may be oriented so as to minimize attenuation at other angles while increasing attenuation in horizontal planes. For example, in multi-story buildings, it may be desirable to minimize attenuation at some downwardly directed angle and increase attenuation at angles only slightly above horizontal. Such can be done by orienting the polarized strips as described above. Accordingly, it is intended that the invention not be limited to the illustrative embodiment but be interpreted within the full spirit and scope of the appended claims.

What is claimed is:

1. Apparatus for controlling light passage through a panel as a function of incident light angle comprising:
    a light transmissive panel having first and second surfaces spaced apart by the thickness of said panel;
    a first plurality of light polarizing elements formed as elongated strips each having an absorption axis at least in the middle thereof aligned in a first predetermined direction, said absorption axis generally continuously varying toward a second absorption axis from the middle of the strips to opposite edges thereof;
    a second plurality of light polarizing elements formed as elongated strips each having an absorption axis at least in the middle thereof aligned in the second predetermined direction, said second plurality of elements being alternately arranged with said first elements to form a first polarized sheet, said first sheet being overlayed on said first surface of said panel, said absorption axis of said second plurality of strips varying toward the first absorption axis from the middle of the strips to opposite edge thereof, said absorption axis of said second strips at their respective edges being substantially identical to the absorption axis of said first strips at adjacent edges thereof such that the absorption axis varies substantially continuously over said sheet;
    a second polarized sheet substantially identical to said first sheet, said second sheet being overlayed on said second surface of said panel, said first and second sheets being positioned such that light impinging on said panel within a preselected range of incidence angles passes through only areas of similar polarization of said first and second plurality of element sand at least some light impinging at angles outside said preselected range passes through areas of different polarization of said first and second plurality of elements; and
    said first and second plurality of elements being selected such that light passing through at least the middle of both of said elements is substantially attenuated.

2. The apparatus of claim 1 wherein the panel comprises a windshield of an automobile and the preselected range of incidence angles varies about a generally horizontal plane.

* * * * *